US012160727B2

(12) United States Patent
Liao et al.

(10) Patent No.: US 12,160,727 B2
(45) Date of Patent: Dec. 3, 2024

(54) SOUND MANAGEMENT SYSTEM FOR MULTIMEDIA DISPLAY APPARATUS AND MANAGING METHOD THEREOF

(71) Applicant: BENQ CORPORATION, Taipei (TW)

(72) Inventors: Yuan-Chen Liao, Taipei (TW); Chen-Cheng Huang, Taoyuan (TW)

(73) Assignee: BenQ Corporation, Taipei (TW)

( * ) Notice: Subject to any disclaimer, the term of this patent is extended or adjusted under 35 U.S.C. 154(b) by 199 days.

(21) Appl. No.: 17/873,199

(22) Filed: Jul. 26, 2022

(65) Prior Publication Data

US 2023/0119651 A1 Apr. 20, 2023

(30) Foreign Application Priority Data

Oct. 20, 2021 (TW) ................................ 110138854

(51) Int. Cl.

| | |
|---|---|
| ***H04S 7/00*** | (2006.01) |
| ***H04R 1/02*** | (2006.01) |
| ***H04R 3/12*** | (2006.01) |
| ***H04R 5/02*** | (2006.01) |
| ***H04R 5/04*** | (2006.01) |
| ***H04S 1/00*** | (2006.01) |

(52) U.S. Cl.

CPC ............ *H04S 7/301* (2013.01); *H04R 1/028* (2013.01); *H04R 5/02* (2013.01); *H04R 5/04* (2013.01); *H04S 1/007* (2013.01); *H04R 2499/15* (2013.01); *H04S 2400/11* (2013.01)

(58) Field of Classification Search

None

See application file for complete search history.

(56) References Cited

U.S. PATENT DOCUMENTS

2007/0263888 A1* 11/2007 Melanson ................. H04S 3/00 381/300
2009/0129604 A1* 5/2009 Enamito ................. H04S 7/302 381/122

(Continued)

FOREIGN PATENT DOCUMENTS

CN 201540450 U 8/2010
CN 104247461 A 12/2014

(Continued)

OTHER PUBLICATIONS

Office action of counterpart application by Taiwan IP Office on May 12, 2022.

*Primary Examiner* — Qin Zhu

(57) ABSTRACT

A sound management system for a multimedia display apparatus includes: a first audio device built in a display apparatus to provide first audio, a second audio device separated from the display apparatus to provide second audio, a portable device separated from both the display and the second audio device, optionally being moved to the first or second position to receive and analyze either a first sound field at a first position or a second sound field at a second positions respectively formed by the first audio and the second audio, and a controller used to notify the first and/or second audio devices to adjust the first and/or second audio according to the analysis to synthesize either a first adjusted sound field at the first position or a second adjusted sound field at the second position with sound characteristics similar to that of a target sound audio.

15 Claims, 8 Drawing Sheets

10

(56) References Cited

U.S. PATENT DOCUMENTS

| | | | | |
|---|---|---|---|---|
| 2014/0003622 | A1* | 1/2014 | Ikizyan | G10L 19/008<br>381/95 |
| 2014/0314256 | A1* | 10/2014 | Fincham | H04R 3/12<br>381/303 |
| 2021/0029482 | A1* | 1/2021 | Crockett | H04S 7/30 |
| 2022/0086579 | A1* | 3/2022 | Holstrom | H04R 29/005 |

FOREIGN PATENT DOCUMENTS

| | | | | |
|---|---|---|---|---|
| TW | 200934279 | A | 8/2009 | |
| TW | 202002543 | A | 1/2020 | |
| WO | WO-2014150598 | A1 * | 9/2014 | H04R 3/12 |

* cited by examiner

SOUND MANAGEMENT SYSTEM FOR MULTIMEDIA DISPLAY APPARATUS AND MANAGING METHOD THEREOF

This application claims the benefit of Taiwan application Serial No. 110138854, field Oct. 20, 2021, the subject matter of which is incorporated herein by reference.

BACKGROUND OF THE DISCLOSURE

Field of the Disclosure

The disclosure relates in general to a multimedia display apparatus, and more particularly to a sound management system for a multimedia display apparatus and the managing method thereof.

Description of the Related Art

With the development of consumer electronic products, multimedia display apparatuses have become one of the most popular apparatuses in the daily life and entertainment of modern people. To take a prior art projector with a built-in audio device as an example, the audio device is usually fixed on the main body of the projector and provides omnidirectional audio sending in all directions, so as to allow unspecified users in front of the display screen to be able to listen to the sound. In some designs, the audio device may provide directional audio sending in a specific direction, with the purpose of allowing a specific user in a specific location to hear better audio quality.

However, no matter which mode is used, as the position of the user (single or multiple) changes, the audio devices of the projector cannot respond to the movements of the users and provide relatively better audio quality in real time.

Therefore, there is a need to provide an advanced sound management system for a multimedia display apparatus and the managing method thereof to overcome the drawbacks of the prior art.

SUMMARY OF THE DISCLOSURE

One embodiment of the present disclosure is to provide a sound management system for a multimedia display apparatus, wherein the sound management system includes a display apparatus, a first audio device, a second audio device, a first portable device and a controller. The first audio device is built in the display apparatus to provide a first audio. The second audio device is separated from the display apparatus to provide a second audio, wherein a first synthesized sound field and a second synthesized sound field are respectively formed by the first audio and the second audio at a first position and a second position. The first portable device is separated from the display apparatus and the second audio device, and can be optionally moved to either the first position or the second position to receive and analyze either first sound characteristics of the first synthesized sound field or second sound characteristics of the second synthesized sound field. The controller is provided in the first portable device and/or the display apparatus, and is used to notify at least one of the first audio device and the second audio device to adjust the first audio and/or the second audio, according to either the first sound characteristics or the second sound characteristics, so as to form either a first adjusted sound field at the first position or a second adjusted sound field at the second position, that has sound characteristics similar to that of a target sound audio.

Another embodiment of the present disclosure provides a managing method of a sound management system for a multimedia display apparatus, wherein the method includes steps as follows: Firstly, a display apparatus is provided. A first audio device built in the display apparatus is then provided to provide a first audio. A second audio device separated from the display apparatus is provided to provide a second audio, wherein a first synthesized sound field and a second synthesized sound field are respectively formed by the first audio and the second audio at a first position and a second position. A first portable device that is separated from the display apparatus and the second audio device and optionally moved to either the first position or the second position is provided to receive and analyze either first sound characteristics of the first synthesized audio or second sound characteristics of the second synthesized sound field. A controller built in the first portable device and/or the display apparatus is provided to notify at least one of the first audio device and the second audio device to adjust the first audio and/or the second audio, according to either the first sound characteristics or the second sound characteristics, so as to form either a first adjusted sound field at the first position or a second adjusted sound field at the second position, that has characteristics similar to that of a target sound audio.

According to the above embodiments, a sound management system for a multimedia display apparatus and the managing method thereof are provided. A portable device that can be moved with the user is provided to receive and analyze characteristics of a synthesized sound field formed by a first audio and a second audio at the user's current location, wherein the first audio and the second audio are respectively emitted by the first audio device built into the display and the second audio device separated from the display. The first audio device and/or the second audio device are then notified to adjust the first audio and/or the second audio, according to the sound characteristics of the synthesized sound field, so as to form an adjusted sound field at the user's current location with sound characteristics similar to that of a predetermined target sound audio.

BRIEF DESCRIPTION OF THE DRAWINGS

The above and other aspects of the disclosure will become better understood with regard to the following detailed description of the preferred but non-limiting embodiment(s). The following description is made with reference to the accompanying drawings.

DETAILED DESCRIPTION OF THE DISCLOSURE

The present disclosure provides a sound management system for a multimedia display apparatus and the managing method thereof to provide a specific user (or multiple users) relatively better sound audios at the user's current location in real time in response to the movements of the specific user. The above and other aspects of the disclosure will become better understood by the following detailed description of the preferred but non-limiting embodiment(s). The following description is made with reference to the accompanying drawings:

Several embodiments of the present disclosure are disclosed below with reference to accompanying drawings. However, the structure and contents disclosed in the embodiments are for exemplary and explanatory purposes only, and the scope of protection of the present disclosure is not limited to the embodiments. It should be noted that the present disclosure does not illustrate all possible embodiments, and anyone skilled in the technology field of the disclosure will be able to make suitable modifications or changes based on the specification disclosed below to meet actual needs without breaching the spirit of the disclosure. The present disclosure is applicable to other implementations not disclosed in the specification.

Figure 1A:
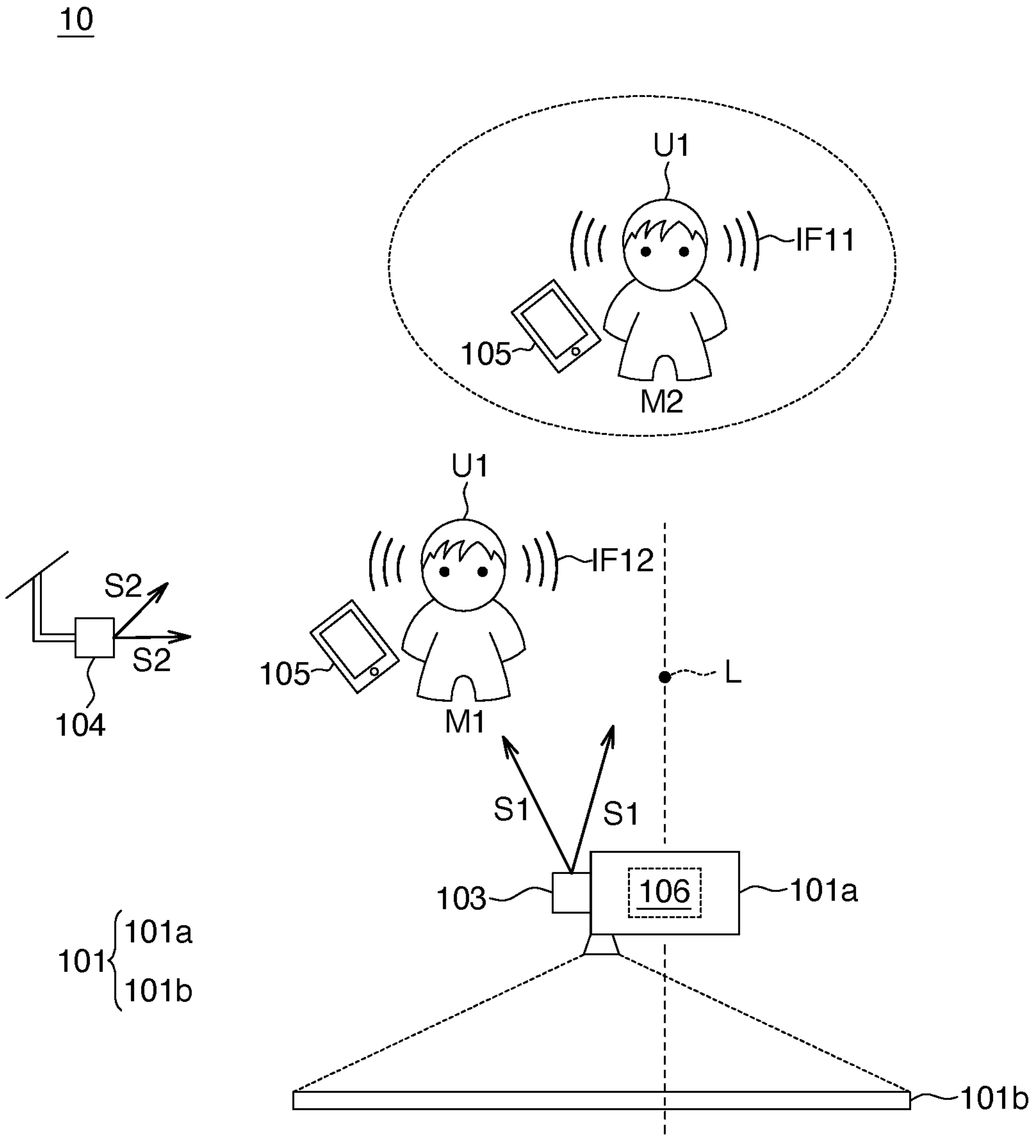
FIGS. 1A and 1B are schematic diagrams illustrating the functional configuration and operation method of a sound management system for a multimedia display apparatus according to one embodiment of the present disclosure.
Figure 1B:
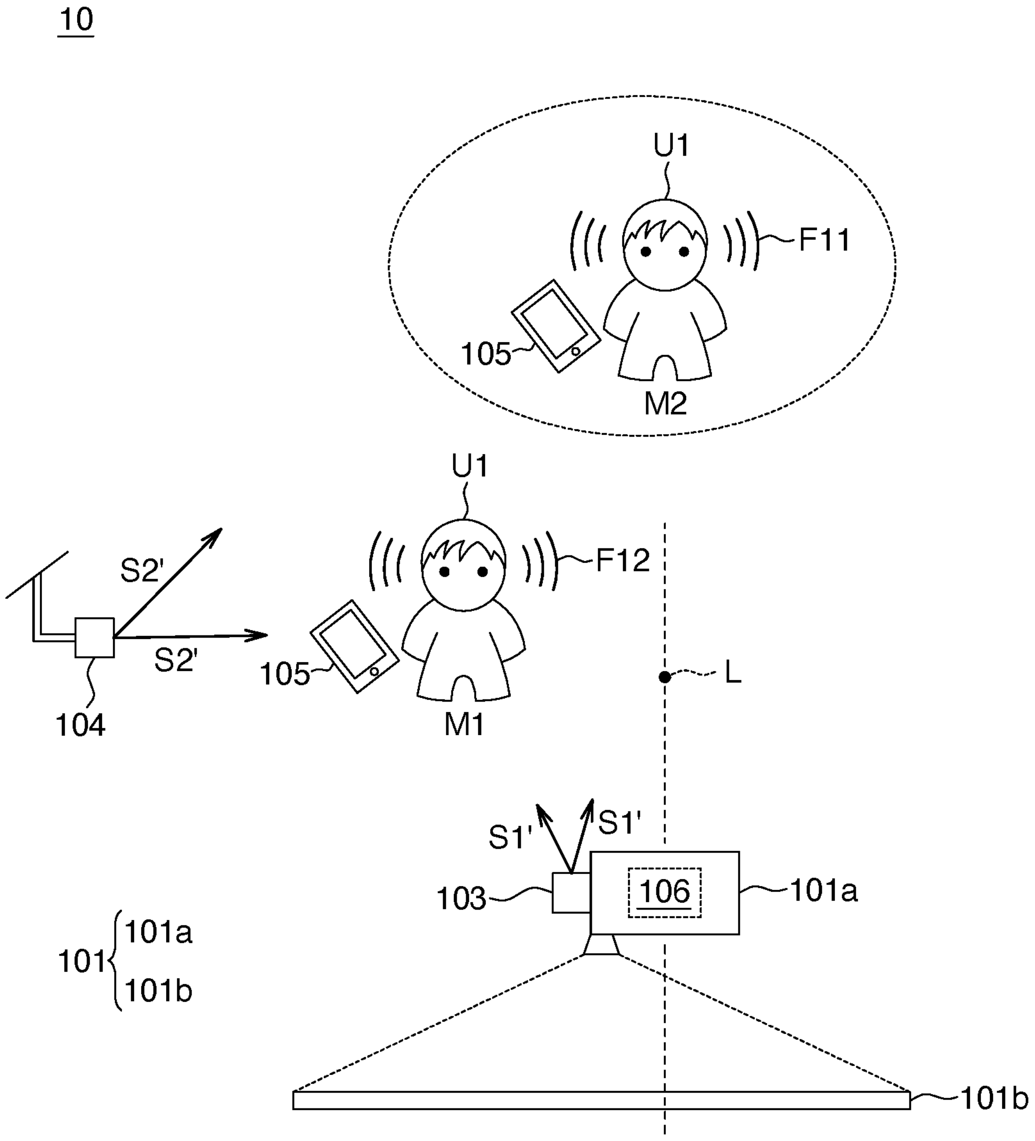

FIGS. 1A and 1B are schematic diagrams illustrating the functional configuration and operation method of a sound management system 10 for a multimedia display apparatus according to one embodiment of the present disclosure. The multimedia display apparatus may be any audio-visual player, platform, or system that includes multiple audio devices and display apparatuses. For example, in the present embodiment, the multimedia display apparatus is an audio-visual player including a display apparatus 101 (including a projector 101*a* and a screen 101*b*), a first audio device 103, a second audio device 104, a first portable device 105 and a controller 106.

The first audio device 103 is built in the projector 101*a* to provide a first audio S1. The second audio device 104 is separated from the projector 101*a* to provide the second audio S2. For example, in some embodiments of the present disclosure, the first audio S1 and the second audio S2 may respectively correspond to the left and right channels of the multimedia image provided by the projector 101*a*. But in other embodiments, the arrangement of the first audio S1 and the second audio S2 is not limited to this regard.

In the present embodiment, the first audio device 103 can be a directive loudspeaker, and the second audio device 104 can be an omnidirectional loudspeaker. That is, the first audio S1 emitted from the first audio device 103 is sent in a single specific direction; the second audio S2 emitted from the second audio device 104 is sent in all directions.

Of note that, although the first audio device 103 is fixed on the main body of the projector 101*a* and has directivity, the sending direction of the first audio S1 can still be altered by rotating the emitting direction of the first audio device 103 according to actual needs. Similarly, although the second audio device 104 is omnidirectional, the second audio S2 provided by the second audio device 104 can still be changed by altering its position.

The first portable device 105 is separated from the display apparatus 101 (for example, the projector 101*a*) and the second audio device 104, and can be optionally moved to any position. For example, the first portable device 105 can be moved to (but not be limited to) the first position M1 or the second position M2. The first portable device 105 can be used to receive the first audio S1 provided by the first audio device 103 and the second audio S2 provided by the second audio device 104 at either the first position M1 or the second position M2. In detail, the first audio S1 and the second audio S2 can form a first synthesized audio (such as, a first synthesized sound field) at the first position M1, and meanwhile form a second synthesized audio (such as, a second synthesized sound field) at the second position M2. The first portable device 105 can be move to either the first position M1 or the second position M2. If the first portable device 10 is moved to the first position M1, it can be used to analyze the first sound characteristics of the first synthesized audio. Alternatively, if the portable device 105 is moved to the second position M2, it can be used to analyze the second sound characteristics of the second synthesized audio.

In some embodiments of the present disclosure, the first portable device 105 may be a portable electronic product, such as a smart phone, a notebook (NB), a personal digital assistant (PDA) or a cell phone, etc. However, the first portable device 105 is not limited to this regard. Any electronic product that can be moved along with the user U1 to different positions, such as the first position M1 or the second position M2, and can receive and analyze sound signals does not beyond the spirit of the first portable device 105 as set forth in the embodiments of the present disclosure.

For example, in the present embodiment, the first portable device 105 may be a smart phone, which uses a mobile phone recording software (Android/iOS) to receive audio signals sent to the first position M1 or the second position M2; and use applications (APP) that detect sound frequencies to analyze the received audio signals. The analysis result is output to the display apparatus 101 (for example, the projector 101*a*) and/or the second audio device 104 via a (wired or) wireless network or other communication components (not shown).

As shown in FIG. 1A, in the initial stage, the first audio S1 and the second audio S2 sent to either the first position M1 or the second position M2 can be combined either to synthesize a first initial sound field (also referred to as the first synthesized sound field) IF11 at the first position M1 or to synthesized a second initial sound field (also referred as to the second synthesized sound field) IF12 at the second position M2. After being analyzed by the first portable device 105 (either at the first position M1 or at the second position M2), it can be determined that the first initial sound field IF11 has a first sound characteristics which includes a first acoustic amplitude, a first acoustic phase, the combination of these two and/or other related acoustic information; or the second initial sound field IF12 has a second sound characteristics which includes a second acoustic amplitude, a second acoustic phase, the combination of these two and/or other related acoustic information.

The controller 106 can be provided in the first portable device 105 or in the display apparatus 101 (for example, the projector 101*a*), or can be provided in both. For example, in some embodiments of the present disclosure, the controller 106 may be (but not limited to) at least one of central processing units (CPUs) (not shown), special purpose logic circuits, general purpose logic circuits, memory elements and the arbitrary combinations thereof, respectively built in the projector 101*a* and the first portable device 105.

In the present embodiment, the controller 106 can perform a comparison operation based on the first sound characteristics or the second sound characteristics and with reference to a target sound characteristics of a predetermined target sound audio (not shown), and use wireless (or wired) network or other communication components to notify the first audio device 103 and/or the second audio device 104 to adjust the first audio S1 and/or the second audio S2, according to the comparison results, so as to output a first adjusted audio S1' and/or a second adjusted audio S2'. As a result, a first adjusted sound field F11 with sound characteristics similar to that of the target sound audio (not shown) can be synthesized at the first position M1; or a second adjusted sound field F12 with sound characteristics similar to that of the target sound audio (not shown) can be synthesized at the second position M2.

The target sound audio (not shown) refers to a sound field formed at a certain predetermined position L in front of the display apparatus 101 by the first audio S1 mitted from the first audio device 103. For example, in the present embodiment, the predetermined position L can be a position in front of the screen 101*b* of the projector 101*a* with a best angle to view the multimedia image provided by the projector 101*a* and to receive the best audio quality provided by the first audio device 103 built-in the projector 101*a*. The target sound characteristics of the target sound audio (not shown) include the acoustic amplitude (hereinafter referred to as the target acoustic amplitude), the acoustic phase (hereinafter referred to as the target acoustic phase) or a combination of these two that are obtained by measuring the first audio S1 at the predetermined position L.

In the present embodiment, the first adjusted sound field F11 at the first position M1 has a first adjusted acoustic amplitude and a first adjusted acoustic phase; the first adjusted acoustic amplitude is substantially equal to an average of the sum of the first acoustic amplitude and the target acoustic amplitude; and the first adjusted acoustic phase is substantially equal to an average of the sum of the first acoustic phase and the target acoustic phase. The second adjusted sound field F12 at the second position M2 has a second adjusted acoustic amplitude and a second adjusted acoustic phase; the second adjusted acoustic amplitude is substantially equal to an average of the sum of the second acoustic amplitude and the target acoustic amplitude; and the second adjusted acoustic phase is substantially equal to an average of the sum of the second acoustic phase and the target acoustic phase.

The adjustment of the first audio S1 and/or the second audio S2 includes adjusting the current, voltage, and/or the output power of both applied to the first audio device 103 and/or the second audio device 104 to change the acoustic signal (including the acoustic amplitude, the acoustic phase and the combination thereof) output by the first audio device 103 and/or the second acoustic device 104.

In addition, in some embodiments, the adjustment of the first audio S1 and/or the second audio S2 also includes altering the emitting direction of the first audio device 103 and/or the position of the second audio device 104. Any action that can substantially change the sound field synthesized at either the first position M1 or the second position M2 (measured by the first portable device 105) in a controllable manner does not exceed the spirit of adjusting the first audio S1 and/or the second audio S2 as described in the present disclosure.

As the position of the user U1 changes (not limited to the first position M1 or the second position M2), the steps as depicted in FIGS. 1A and 1B can be repeated to adjust the sound field synthesized at the user U1's current position in real time. By adjusting the first audio S1 and/or the second audio S2, no matter how the position of the user U1 changes, the user U1 can receive the best sound field similar to that receive at the predetermined position at the current position.

Figure 2A:
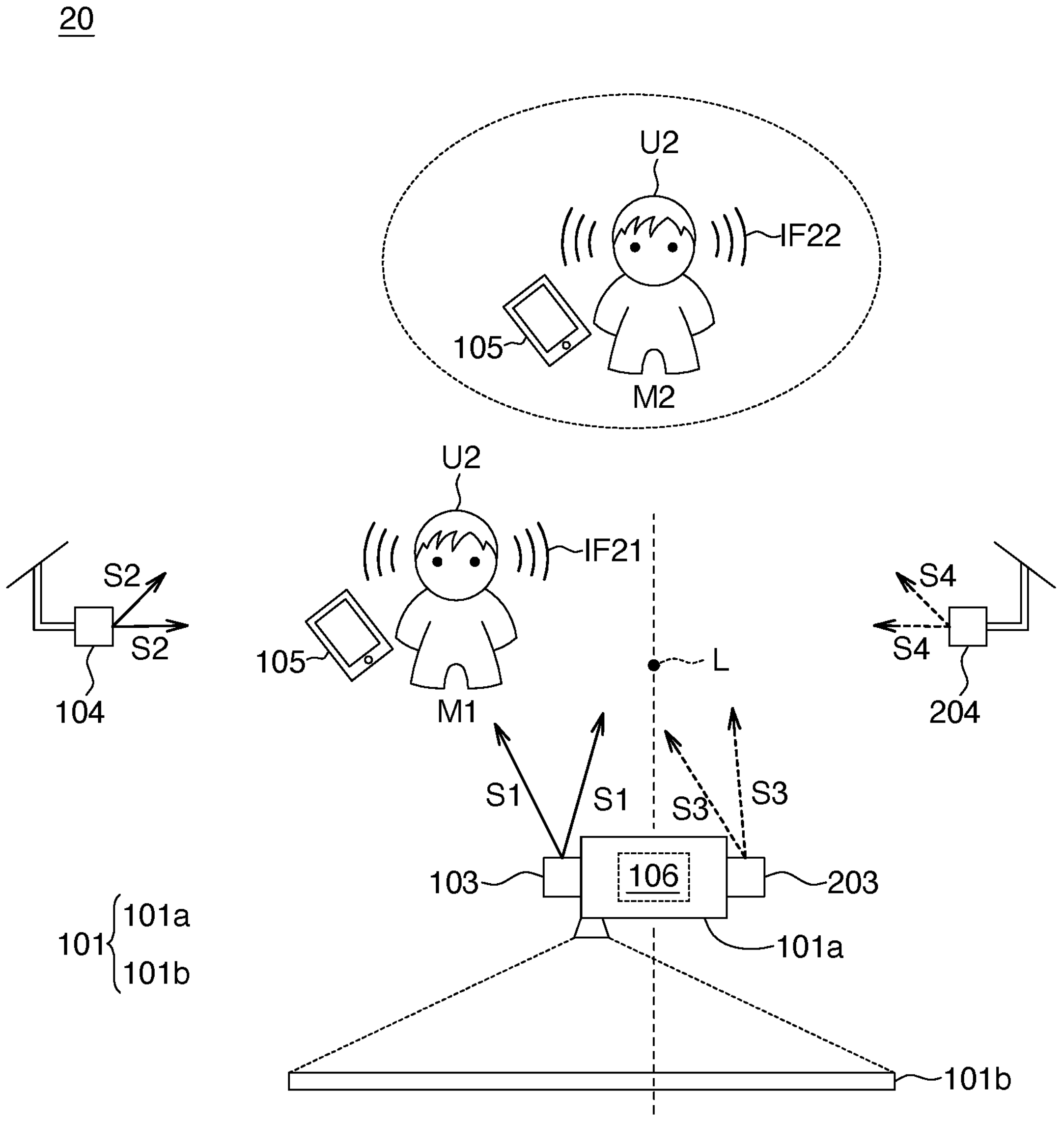
FIGS. 2A and 2B are schematic diagrams illustrating the functional configuration and operation method of a sound management system for a multimedia display apparatus according to another embodiment of the present disclosure.
Figure 2B:
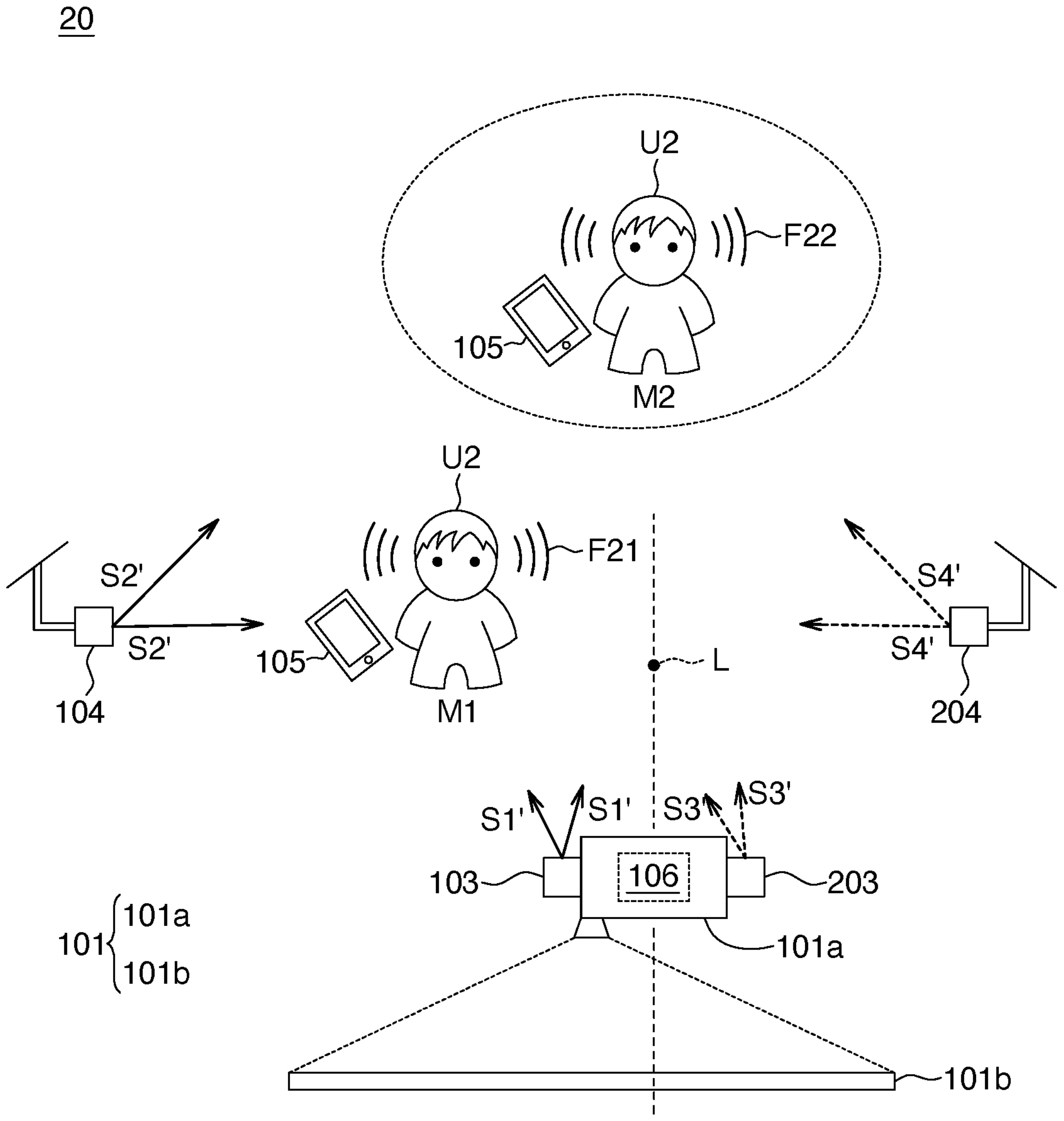

FIGS. 2A and 2B are schematic diagrams illustrating the functional configuration and operation method of a sound management system 20 for a multimedia display apparatus according to another embodiment of the present disclosure. The functional configuration and operation method of the sound management system 20 are substantially similar to that of the sound management system 10. The major difference is that the sound management system 20 further includes a third audio device 203 and a fourth audio device 204.

The third audio device 203 is built in the display apparatus 101 (for example, the projector 101*a*) and used to provide a third audio S3. The fourth audio device 204 is separated from the projector 101*a* and the second audio device 104 and used to provide a fourth audio S4. Since the configuration and operation of the third audio device 203 and the fourth audio device 204 are the same as those of the first audio device 103 and the second audio device 104, thus they will not be redundantly repeated here.

In the initial stage, the first audio device 103 provides the first audio S1, the second audio device 104 provides the second audio S2, the third audio device 203 provides the third audio S3, and the fourth audio device 204 provides the fourth audio S4. The first portable device 105 can select at least two of the first audio S1, the second audio S2, the third audio S3 and the fourth audio S4, according to their signal strength received at the position (either the first position M1 or the second position M2) it is located, either to analyze a third initial (also referred to as the third synthesized sound field) sound field IF21 synthesized at the first position M1 or to analyze a fourth initial (also referred to as the fourth synthesized sound field) sound field IF22 synthesized at the second position M2.

After being analyzed by the first portable device 105, it can be determined that the third initial sound field IF21 has a third sound characteristics which includes a third acoustic amplitude, a third acoustic phase, the combination of these two, and/or other related acoustic information; and the fourth initial sound field IF22 has a fourth sound characteristics which includes a fourth acoustic amplitude, a fourth acoustic phase, the combination of these two, and/or other related acoustic information.

The controller 106 can use wireless (or wired) network or other communication components to notify the selected at least two of the first audio device 103, the second audio device 104, the third audio device 203 and the fourth audio device 204 to adjust at least two of the first audio S1, the second audio S2, the third audio S3 and the fourth audio S4, so as to output a first adjusted audio S1', a second adjusted audio S2', a third adjusted audio S3' and/or a fourth adjusted audio S4'. As a result, a third adjusted sound field F21 with sound characteristics similar to that of the target sound audio (not shown) can be synthesized at the first position M1; or a fourth adjusted sound field F22 with sound characteristics similar to that of the target sound audio (not shown) can be synthesized at the second position M2.

As the position of the user U1 changes (not limited to the first position M1 or the second position M2), the steps as depicted in FIGS. 2A and 2B can be repeated to adjust the sound field synthesized at the user U1's current position in real time. By adjusting at least two of the first audio S1, the second audio S2, the third audio S3 and the fourth audio S4, no matter how the position of the user U1 changes, the user U1 can receive the best sound field similar to that receive at the predetermined position at the current position.

FIGS. 3A to 3D are schematic diagrams illustrating the functional configuration and operation method of a sound management system 30 for a multimedia display apparatus according to another embodiment of the present disclosure. The functional configuration and operation method of the sound management system 30 are substantially similar to that of the sound management system 10. The major difference is that the sound management system 20 further includes a second portable device 305 (for example, the smart phone held by another user U2).

The second portable device 305 is separated from the display apparatus 101 (for example, the projector 101*a*) and the second audio device 104, and can be optionally moved to any movable position (for example, a third position M3), so as to receive and analyze a sound filed synthesized by the first audio S1 provided by the first audio device 103 and the second audio S2 provided by the second audio device 104 at the movable position (i.e. the third position M3).

Figure 3A:
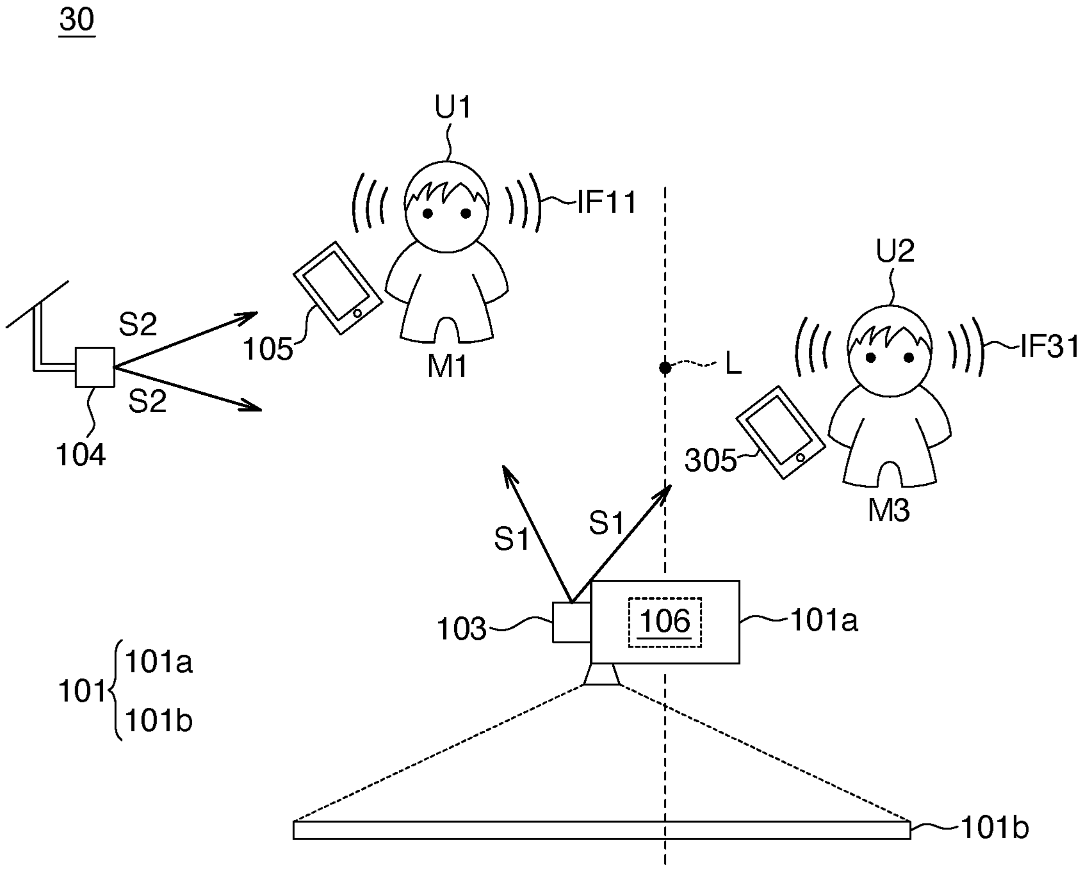
FIGS. 3A to 3D are schematic diagrams illustrating the functional configuration and operation method of a sound management system for a multimedia display apparatus according to yet another embodiment of the present disclosure.

As shown in FIG. 3A, in the initial stage, the user U1 holds the first portable device 105 in the first position M1; the first audio S1 and the second audio S2 sent to the first position M1 are combined to synthesize the first initial sound field IF11. The first portable device 105 receives and analyzes the first sound characteristics of the first initial sound field IF11. The first audio S1 and the second audio S2 sent to the third position M3 are combined to synthesize a fifth initial sound field IF31. The second portable device 305 receives and analyzes the fifth sound characteristics of the fifth initial sound field IF31.

Figure 3B:
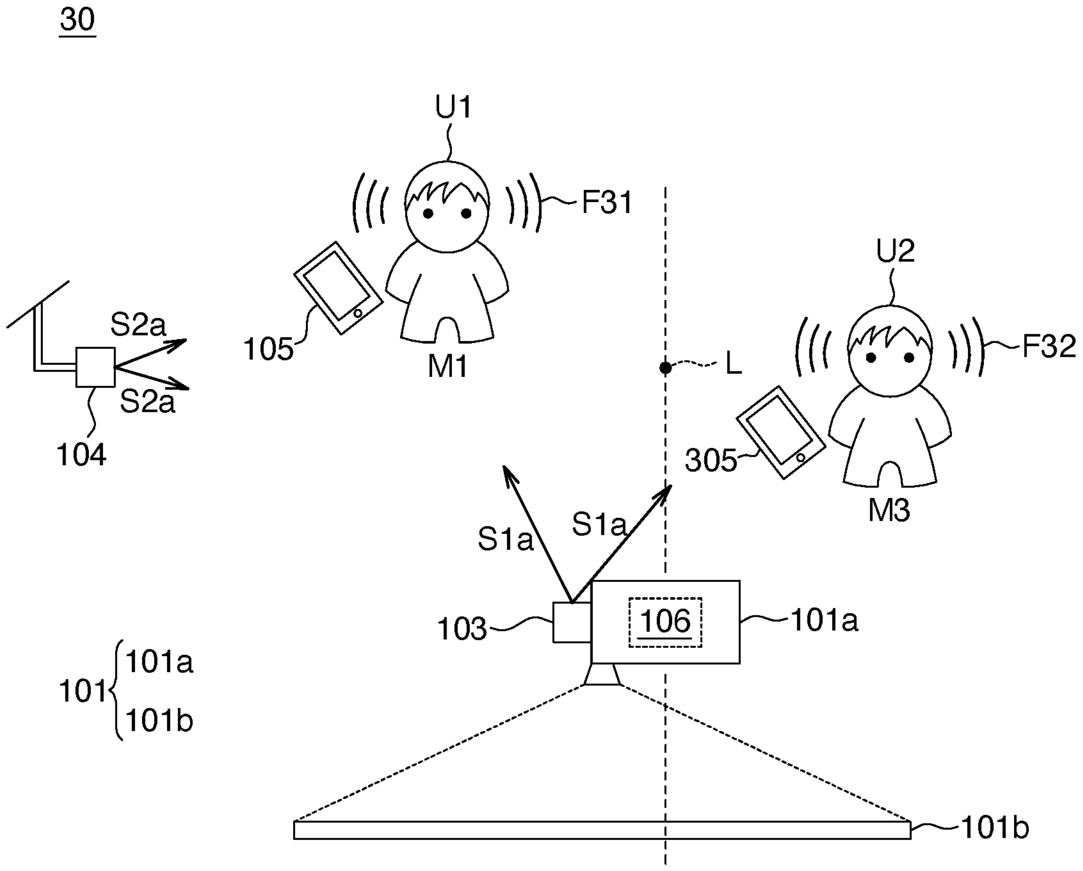

The controller 106 can use wireless (or wired) network or other communication components to notify the first audio device 103 and/or the second audio device 104, according to the first sound characteristics and the fifth sound characteristics, to adjust the first audio S1 and/or the second audio, so as to output a first adjusted audio S1*a* and/or a second adjusted audio S2*a*. The first adjusted audio S1*a* and the second adjusted audio S2*a* sent to the first position M1 are then synthesized to form a fifth adjusted sound field F31 at the first position M1 with a sound characteristic similar to that of the target sound audio. Meanwhile the first adjusted audio S1*a* and the second adjusted audio S2*a* sent to the second position M2 are synthesized to form a sixth adjusted sound field F32 with a sound characteristic similar to that of the target sound audio (as shown in FIG. 3B).

Figure 3C:
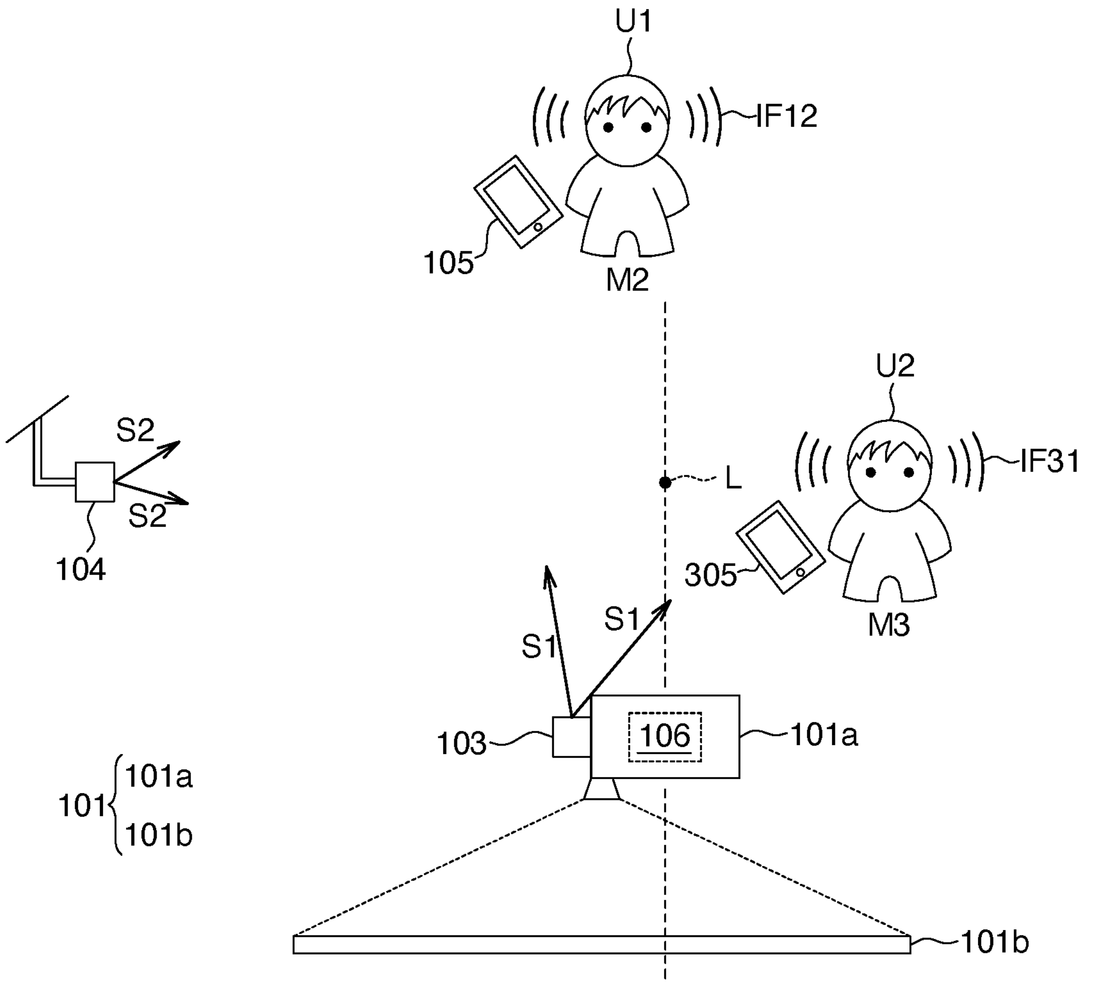

As shown in FIG. 3C, in the initial stage, the user U1 holds the first portable device 105 in the second position M2; the first audio S1 and the second audio S2 sent to the second position M2 are combined to synthesize the second initial sound field IF12. The first portable device 105 receives and analyzes the second sound characteristics of the second initial sound field IF12. The first audio S1 and the second audio S2 sent to the third position M3 are combined to synthesize the fifth initial sound field IF31. The second portable device 305 receives and analyzes the fifth sound characteristics of the fifth initial sound field IF31.

Figure 3D:
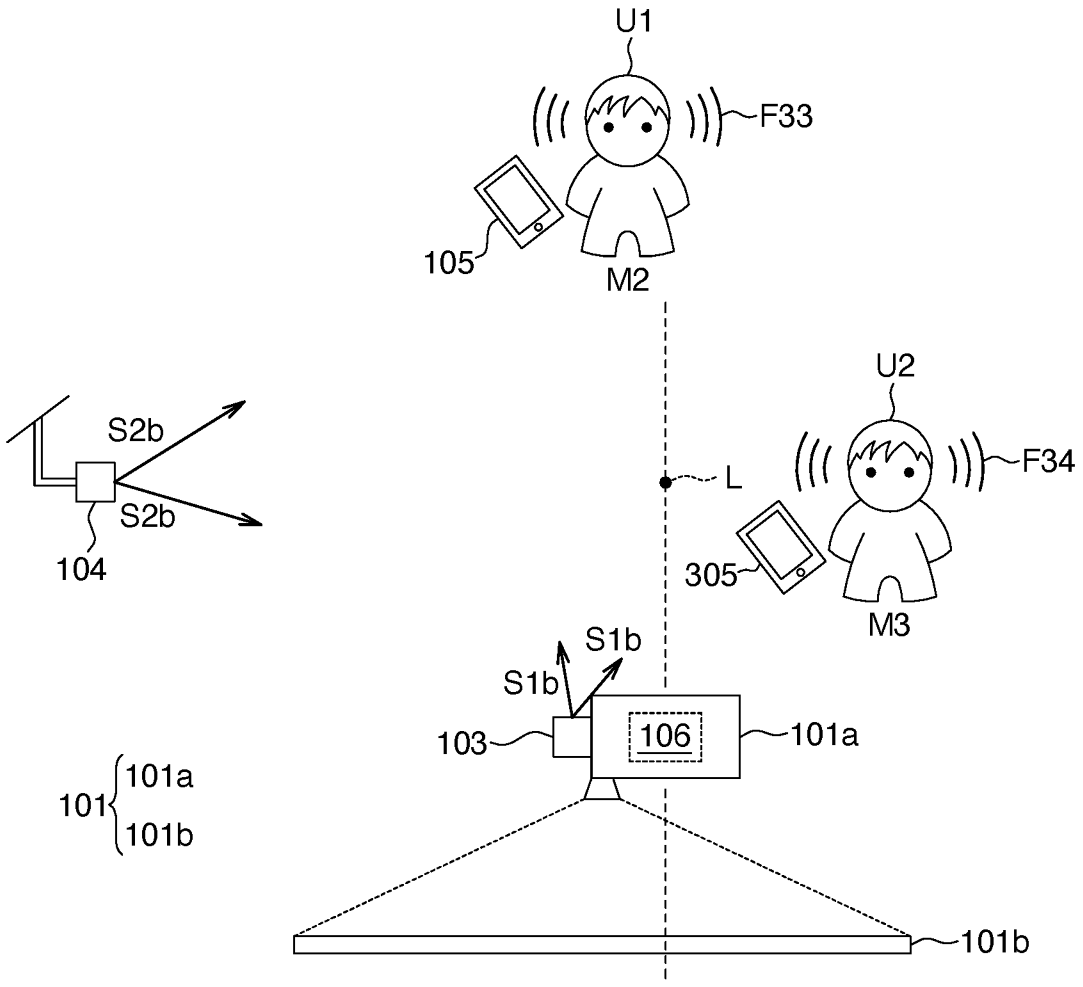

The controller 106 can use wireless (or wired) network or other communication components to notify the first audio device 103 and/or the second audio device 104, according to the second sound characteristics and the fifth sound characteristics, to adjust the first audio S1 and/or the second audio, so as to output a first adjusted audio S1*b* and/or a second adjusted audio S2*b*. The first adjusted audio S1*b* and the second adjusted audio S2*b* sent to the second position M2 are then synthesized to form a seventh adjusted sound field F33 at the second position M2 with a sound characteristic similar to that of the target sound audio. Meanwhile the first adjusted audio S1*b* and the second adjusted audio S2*b* sent to the third position M3 are synthesized to form an eighth adjusted sound field F34 with a sound characteristic similar to that of the target sound audio (as shown in FIG. 3D).

As the positions of the users U1 and U2 (respectively holding the first portable device 105 and the second portable device 305) are change (not limited to the first position M1, the second position M2 or the third position M3), the steps as depicted in FIGS. 3A to 3D can be repeated to adjust the sound field synthesized at the current positions where the users U1 and U2 are located in real time. By adjusting at least two of the first audio S1 and the second audio S2, no matter how the positions of the users U1 and U2 change, the users U1 and U2 can receive the best sound field similar to that receive at the predetermined position at the current position.

According to the above embodiments, a sound management system for a multimedia display apparatus and the managing method thereof are provided. A portable device that can be moved with the user is provided to receive and analyze characteristics of a synthesized sound field formed by a first audio and a second audio at the user's current location, wherein the first audio and the second audio are respectively emitted by the first audio device built into the display and the second audio device separated from the display. The first audio device and/or the second audio device are then notified to adjust the first audio and/or the second audio, according to the sound characteristics of the synthesized sound field, so as to form an adjusted sound field at the user's current location with sound characteristics similar to that of a predetermined target sound audio.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A sound management system for a multimedia display apparatus, comprising:

a display apparatus;

a first audio device, built in the display apparatus to provide a first audio;

a second audio device, separated from the display apparatus to provide a second audio;

wherein a first synthesized sound field and a second synthesized sound field are respectively formed by the first audio and the second audio at a first position and a second position;

a first portable device, separated from the display apparatus and the second audio device, optionally being moved to either the first position or the second position to receive and analyze either first sound characteristics of the first synthesized sound field or second sound characteristics of the second synthesized sound field; and a controller, provided in the first portable device and/or the display apparatus, and used to notify at least one of the first audio device and the second audio device to adjust the first audio and/or the second audio, according to either the first sound characteristics or the second sound characteristics, so as to form either a first adjusted sound field at the first position or a second adjusted sound field at the second position, that has sound characteristics similar to that of a target sound audio.

2. The sound management system according to claim 1, wherein the sound characteristics of the target sound audio comprises an acoustic amplitude, an acoustic phase or a combination of these two that are obtained by measuring the first audio at a predetermined position.

3. The sound management system according to claim 1, wherein the first audio device is directive and emitting the first audio is in a single specific direction; the second audio device is omnidirectional and emitting the second audio in all directions.

4. The sound management system according to claim 3, wherein the step of adjusting the first audio and/or the second audio comprises altering the single specific direction for emitting the first audio.

5. The sound management system according to claim 1, wherein a position of the second audio device is alterable.

6. The sound management system according to claim 1, further comprising:

a third audio device, built in the display apparatus and used to provide a third audio; and a fourth audio device, separated from the display apparatus and the second audio device, and used to provide a fourth audio;

wherein the first portable device selects at least two of the first audio, the second audio, the third audio and the fourth audio to obtain either third sound characteristics of a third synthesized sound field formed at the first position or fourth sound characteristics of a fourth synthesized sound field formed at the second position;

the controller notifies the selected at least two of the first audio device, the second audio device, the third audio device and the fourth audio device to adjust at least two of the first audio, the second audio, the third audio and the fourth audio, so as to synthesize either a third adjusted sound field at the first position or a fourth adjusted sound field at the second position, that has sound characteristics similar to that of the target sound audio.

7. The sound management system according to claim 1, further comprising a second portable device separated from the display apparatus and the second audio device, and optionally moved to a movable position, so as to receive and analyze fifth sound characteristics of a fifth sound field formed by the first audio and the second audio at the movable position;

wherein the controller is used to notify at least one of the first audio device and the second audio device, according to either the first sound characteristics or the fifth sound characteristics, to adjust the first audio and/or the second audio, so as to form either a fifth adjusted sound field at the first position or a sixth adjusted sound field at the movable position, that has sound characteristics similar to that of the target sound audio; or used to notify at least one of the first audio device and the second audio device, according to either the second sound characteristics or the fifth sound characteristics, to adjust the first audio and/or the second audio, so as to form either a seventh adjusted sound field at the second position or an eighth adjusted sound field at the movable position, that has sound characteristics similar to that of the target sound audio.

8. The sound management system according to claim 1, wherein the first adjusted sound field has a first adjusted acoustic amplitude and a first adjusted acoustic phase; the target audio has a target acoustic amplitude and a target acoustic phase; the first synthesized sound field has a first acoustic amplitude and a second acoustic phase; the first adjusted acoustic amplitude is substantially equal to an average of the sum of the first acoustic amplitude and the target acoustic amplitude; and the first adjusted acoustic phase is substantially equal to an average of the sum of the first acoustic phase and the target acoustic phase.

9. The sound management system according to claim 1, wherein the multimedia display apparatus is used to display a multimedia image; the first audio and the second audio respectively correspond to a left channel and a right channel of the multimedia image.

10. A sound managing method of a management system for a multimedia display apparatus, comprising:

providing a display apparatus;

providing a first audio device built in the display apparatus to provide a first audio;

providing a second audio device separated from the display apparatus to provide a second audio; wherein a first synthesized sound field and a second synthesized sound field are respectively formed by the first audio and the second audio at a first position and a second position;

providing a first portable device separated from the display apparatus and the second audio device, and optionally being moved to either the first position or the second position to receive and analyze either first sound characteristics of the first synthesized sound field or second sound characteristics of the second synthesized sound field; and providing a controller built in the first portable device and/or the display apparatus to notify at least one of the first audio device and the second audio device to adjust the first audio and/or the second audio, according to either the first sound characteristics or the second sound characteristics, so as to form either a first adjusted sound field at the first position or a second adjusted sound field at the second position, that has sound characteristics similar to that of a target sound audio.

11. The method according to claim 10, wherein the first audio device is directive and emitting the first audio is in a single specific direction; the second audio device is omnidirectional and emitting the second audio in all directions; and the step of adjusting the adjust the first audio comprises altering the single specific direction for emitting the first audio.

12. The method according to claim 10, wherein the step of adjusting the first audio and/or the second audio comprises altering a position of the second audio device.

13. The method according to claim 10, further comprising:

providing a third audio device built in the display apparatus and used to provide a third audio;

providing a fourth audio device separated from the display apparatus and the second audio device and to provide a fourth audio;

using the first portable device to select at least two of the first audio, the second audio, the third audio and the fourth audio to obtain either third sound characteristics of a third synthesized sound field formed at the first position or fourth sound characteristics of a fourth synthesized sound field formed at the second position; and using the controller to notify the selected at least two of the first audio device, the second audio device, the third audio device and the fourth audio device to adjust at least two of the first audio, the second audio, the third audio and the fourth audio, so as to synthesize either a third adjusted sound field at the first position or a fourth adjusted sound field at the second position, that has sound characteristics similar to that of the target sound audio.

14. The method according to claim 10, further comprising:

providing a second portable device separated from the display apparatus and the second audio device, and optionally be moved to a movable position, so as to receive and analyze fifth sound characteristics of a fifth sound field formed by the first audio and the second audio at the movable position;

using the controller to notify at least one of the first audio device and the second audio device, according to either the first sound characteristics or the fifth sound characteristics, to adjust the first audio and/or the second audio, so as to form either a fifth adjusted sound field at the first position or a sixth adjusted sound field at the movable position, that has sound characteristics similar to that of the target sound audio; or used to notify at least one of the first audio device and the second audio device, according to either the second sound characteristics or the fifth sound characteristics, to adjust the first audio and/or the second audio, so as to form either a seventh adjusted sound field at the second position or an eighth adjusted sound field at the movable position, that has sound characteristics similar to that of the target sound audio.

15. The method according to claim 10, wherein the first adjusted sound field has a first adjusted acoustic amplitude and a first adjusted acoustic phase; the target audio has a target acoustic amplitude and a target acoustic phase; the first synthesized sound field has a first acoustic amplitude and a second acoustic phase; the first adjusted acoustic amplitude is substantially equal to an average of the sum of the first acoustic amplitude and the target acoustic amplitude; and the first adjusted acoustic phase is substantially equal to an average of the sum of the first acoustic phase and the target acoustic phase.

* * * * *